United States Patent
Danielyan

(10) Patent No.: US 8,965,750 B2
(45) Date of Patent: Feb. 24, 2015

(54) ACQUIRING ACCURATE MACHINE TRANSLATION

(75) Inventor: Tatiana Danielyan, Moscow (RU)

(73) Assignee: ABBYY InfoPoisk LLC (RU)

(*) Notice: Subject to any disclaimer, the term of this patent is extended or adjusted under 35 U.S.C. 154(b) by 558 days.

(21) Appl. No.: 13/299,111

(22) Filed: Nov. 17, 2011

(65) Prior Publication Data
US 2013/0132065 A1    May 23, 2013

(51) Int. Cl.
G06F 17/28    (2006.01)

(52) U.S. Cl.
USPC .................. 704/3; 704/2; 704/5; 704/277

(58) Field of Classification Search
USPC ................. 704/1–10, 251, 255, 257, 270, 277
See application file for complete search history.

(56) References Cited

U.S. PATENT DOCUMENTS

| | | | |
|---|---|---|---|
| 5,995,920 A * | 11/1999 | Carbonell et al. | 704/9 |
| 6,076,051 A | 6/2000 | Messerly et al. | |
| 6,081,774 A | 6/2000 | de Hita et al. | |
| 6,246,977 B1 | 6/2001 | Messerly et al. | |
| 7,672,831 B2 | 3/2010 | Todhunter et al. | |
| 8,229,730 B2 | 7/2012 | Van Den Berg et al. | |
| 8,229,944 B2 | 7/2012 | Latzina et al. | |
| 8,271,453 B1 | 9/2012 | Pasca et al. | |
| 8,285,728 B1 | 10/2012 | Rubin | |
| 8,301,633 B2 | 10/2012 | Cheslow | |
| 8,402,036 B2 | 3/2013 | Blair-Goldensohn et al. | |
| 8,533,188 B2 | 9/2013 | Yan et al. | |
| 8,548,951 B2 | 10/2013 | Solmer et al. | |
| 8,577,907 B1 | 11/2013 | Singhal et al. | |
| 2002/0128814 A1† | 9/2002 | Brandon | |
| 2004/0064438 A1* | 4/2004 | Kostoff | 707/1 |
| 2007/0203688 A1* | 8/2007 | Fuji et al. | 704/2 |
| 2007/0233460 A1† | 10/2007 | Lancaster | |
| 2007/0250305 A1* | 10/2007 | Maxwell, III | 704/4 |
| 2011/0055188 A1 | 3/2011 | Gras | |
| 2011/0301941 A1 | 12/2011 | De Vocht | |

(Continued)

FOREIGN PATENT DOCUMENTS

| | | |
|---|---|---|
| EP | 2400400 A1 | 12/2001 |
| WO | 2011160204 A1 | 12/2011 |

OTHER PUBLICATIONS

Marcus Sammer, Kobi Reiter, Stephen Soderland, Katrin Kirchhoff, Oren Etzioni; "Ambiguity Reduction for Machine Translation: Human-Computer Collaboration"; pp. 193-202; Aug. 2006; The Association for Machine Translation in the Americas; Cite 3 source: Proceedings of the 7th Conference of the Association for Machine Translation in the Americas; URL for cite 3: http://www.mt-archive.info/AMTA-2006-Sammer.pdf.†

*Primary Examiner* — Huyen X. Vo

(74) *Attorney, Agent, or Firm* — LeighAnn Weiland; Veronica Weinstein

(57) ABSTRACT

A method is disclosed for translating a sentence from a source language or input language into an output language. The method includes analyzing a source sentence using linguistic descriptions of the source language, constructing a language-independent semantic structure to represent the meaning of the source sentence, and generating an output sentence to represent the meaning of the source sentence using linguistic descriptions of the output language. To improve the accuracy of translation, the analysis or synthesis stage may include ratings or statistics obtained by analyzing a corpus of parallel texts. Disambiguation is remedied automatically or through user input such as through user interface elements.

17 Claims, 2 Drawing Sheets

(56) References Cited

U.S. PATENT DOCUMENTS

| | | |
|---|---|---|
| 2012/0023104 A1 | 1/2012 | Johnson et al. |
| 2012/0030226 A1 | 2/2012 | Holt et al. |
| 2012/0131060 A1 | 5/2012 | Heidasch et al. |
| 2012/0197885 A1 | 8/2012 | Patterson |
| 2012/0203777 A1 | 8/2012 | Laroco, Jr. et al. |
| 2012/0221553 A1 | 8/2012 | Wittmer et al. |
| 2012/0246153 A1 | 9/2012 | Pehle |
| 2012/0296897 A1 | 11/2012 | Hin-Jing et al. |
| 2013/0013291 A1 | 1/2013 | Bullock et al. |
| 2013/0054589 A1 | 2/2013 | Cheslow |
| 2013/0091113 A1 | 4/2013 | Gras |
| 2013/0138696 A1 | 5/2013 | Turdakov et al. |
| 2013/0185307 A1 | 7/2013 | El-Yaniv et al. |
| 2013/0254209 A1 | 9/2013 | Kang et al. |
| 2013/0282703 A1 | 10/2013 | Puterman-Sobe et al. |
| 2013/0311487 A1 | 11/2013 | Moore et al. |
| 2013/0318095 A1 | 11/2013 | Harold |
| 2014/0012842 A1 | 1/2014 | Yan et al. |

\* cited by examiner
† cited by third party

ACQUIRING ACCURATE MACHINE TRANSLATION

BACKGROUND OF THE INVENTION

1. Field of the Invention

Embodiments of the invention generally relate to the field of automated translation of natural-language sentences using various linguistic descriptions.

2. Description of the Related Art

Prior machine translation (MT) systems differ in the approaches and methods that they use and also in their abilities to recognize various complex language constructs and produce quality translation of texts from one language into another.

SUMMARY OF THE INVENTION

The present invention generally relates to methods, computer-readable media, devices and systems for translating a sentence from an input language into an output language. In one embodiment, a method of translating a sentence from a source language into an output language includes analyzing a source sentence using linguistic descriptions of the source language, constructing a language-independent semantic structure to represent the meaning of the source sentence, and generating an output sentence to represent the meaning of the source sentence in the output language using linguistic descriptions of the output language. To improve the accuracy of translation, the analysis and/or synthesis stage may include ratings and statistics obtained by analyzing a corpus of parallel texts.

There are programs that can translate texts from one natural language to another one. Some of them can analyze the syntax and the semantics of a sentence. Some of them employ a large number of diverse linguistic descriptions (e.g., morphological, syntactic, semantic and pragmatic descriptions) to "understand" the meaning of the sentence, to represent it in language-independent terms, and then to generate a corresponding sentence in the output language. However, the problem of disambiguation arises anyway, which can be resolved in different ways.

Very often several translation options are available. To select not only the most accurate but also the most probable option, various ratings may be used both at an analysis stage and at a synthesis stage. Examples of generating a rating includes the use of statistics, a priori assessments of lexical meanings and various syntactical and lexical constructs which may be assigned manually, automatically or a combination of manual and automatic assignment by means of applying special rules. Certain statistics may be obtained through analysis of a tagged corpus of parallel texts in a process known as statistical analysis.

BRIEF DESCRIPTION OF THE DRAWINGS

So that the manner in which the recited features of the present invention can be understood in detail, a more particular description of the invention, briefly summarized above, may be had by reference to embodiments, some of which are illustrated in the appended drawings. However, the appended drawings illustrate only typical embodiments of this invention and are therefore not to be considered limiting of its scope, for the invention may admit to other equally effective embodiments.

DETAILED DESCRIPTION

Embodiments of the invention provide a method for, and computer system configured to, efficiently and completely translate a document and the like in an input language into an output language. While a document is described, it is to be understood that a document may be a sentence, sentence fragment, phrase, expression, page of text, Web page, sign, menu, label and the like.

A document may be translated by means of any MT system. Some of such MT systems can analyze each sentence and recognize its linguistic structure and semantics in order to "understand" its meaning. If the system uses exhaustive linguistic descriptions to analyze a sentence in the input language, it can recognize the meaning of the sentence and subsequently generate an output sentence in the output language. Nevertheless, the problem of syntactical and semantic ambiguities may appear during the process of translation.

A user can "help" the system produce an accurate translation in the fastest possible way. For example, the user may take advantage of one or a combination of the following actions to deal with words (selected by the user such as through a user interface, SMS text message, or other means) that have many meanings in the input language.

If lexical meanings of the words in the input language are organized in a system of classes, the user or the system can specify the class of the selected word (for example, to point out the semantic class), and the system will chose the translation from words of the specified semantic class.

A user or the system may select a similar notion in the input language, for example, a synonym, which can be regarded as an interpretation of the selected word.

A user or the system may specify the subject area where the corresponding term for translations will be searched.

A user or the system may specify the translation of the word in the output language by typing it in or choosing it from a list. Translations can be ordered according to various criteria, including heuristic evaluations or probability (frequency) in either the source (input) language or the output language. The probability of a word can be determined by dictionary or on the basis of a statistical analysis of parallel corpora, or in any number of other ways.

After the user or the system chooses a translation, the system may repeat the translating process for the fragment, which may be a sentence, a paragraph, or the entire text, and use the syntactical model and other parameters of the selected translation variant in this process.

Figure 1:
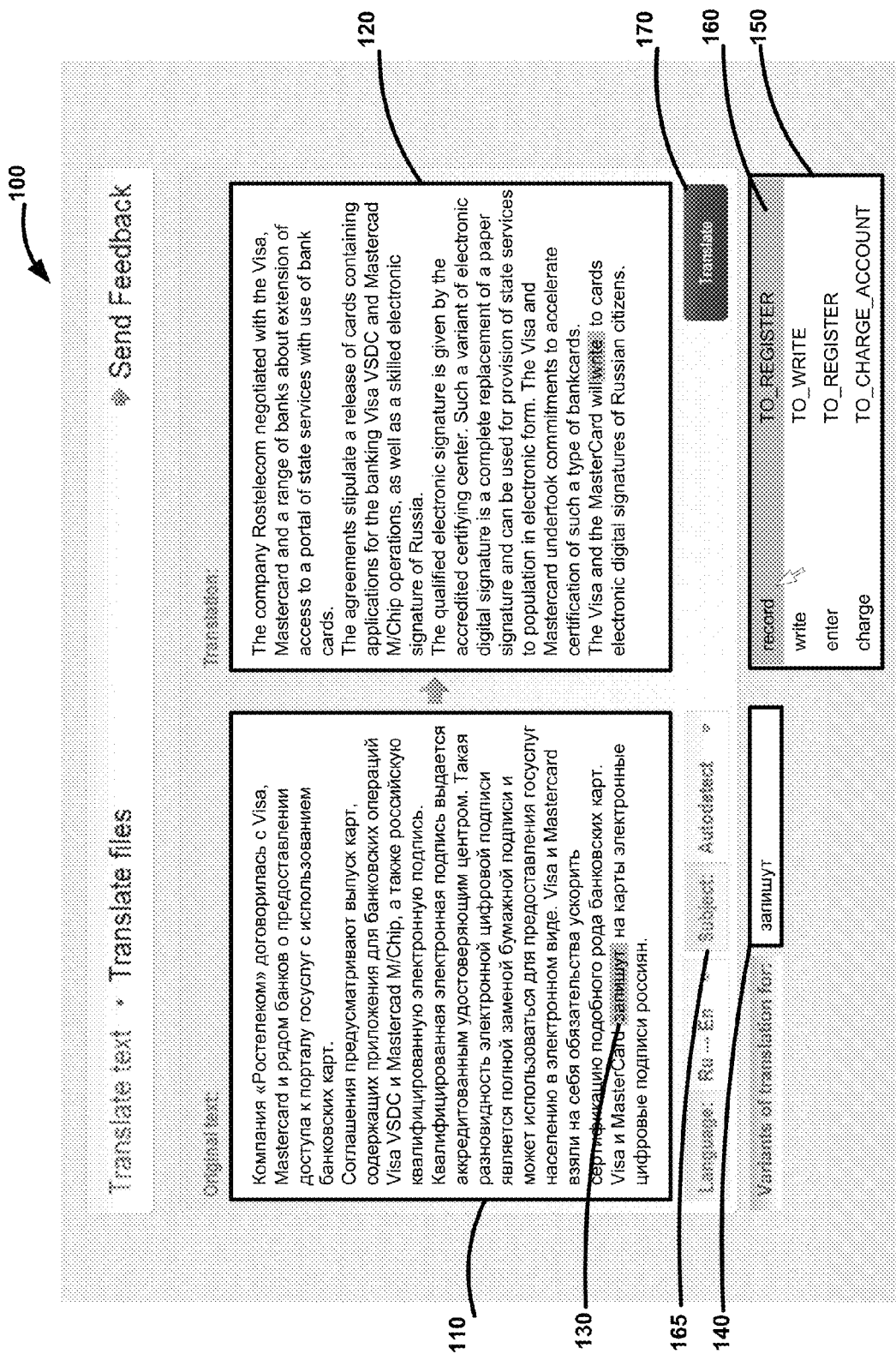
FIG. 1 is an example of an interface of the implemented machine translation process.

FIG. 1 is an example of an interface 100 of the implemented machine translation process. With reference to FIG. 1, a word 130 in the source text 110 or in translation text 120, which may be, for example, highlighted in a certain color or underlined, may be replaced by the word chosen by the user. The selected word may be displayed, for example, in a special window 140, and possible variants may be presented in the list box 150 where the user can select an appropriate variant 160.

The FIG. 1 shows that, besides lexical meanings, the list box 150 may contain their semantic classes. For example, the list box 150 may display the semantic class TO_REGISTER for the variant "record". The semantic classes are semantic notions (semantic entities) and named semantic classes are arranged into one or more semantic hierarchies—hierarchical parent-child relationships—similar to a tree. In general, a child semantic class inherits most properties of its direct parent and all ancestral semantic classes. For example, semantic class SUBSTANCE is a child of semantic class ENTITY and the parent of semantic classes GAS, LIQUID, METAL, WOOD_MATERIAL, etc.

Additionally, the list-box 165, titled "Subject" allows a user to specify the subject of the translated text, for example, Business, Law, Patents, Medicine, Biology, etc. The list-box 165 allows a user to narrow the list of options to a particular subject or field of study, such a field of study that has given a particular or special meaning to particular words. For example, the word "class" to a computer programmer may have a particular meaning (e.g., a computing construction with certain features, characteristics or functionalities). If the meaning of "Subject" is not selected, the default value "Auto-detect" is used, and the subject area may be defined automatically, for example, by means of a text classifier, or by means of syntactic and/or semantic analysis of the fragment or the whole text.

After the word is replaced, the text may be translated again. The button 170 initializes the process of translating the fragment or a file. The syntactical model of the word chosen by the user may be taken into account during this translation. The user can optionally choose to replace the word in this sentence only or throughout the entire text.

Figure 2:
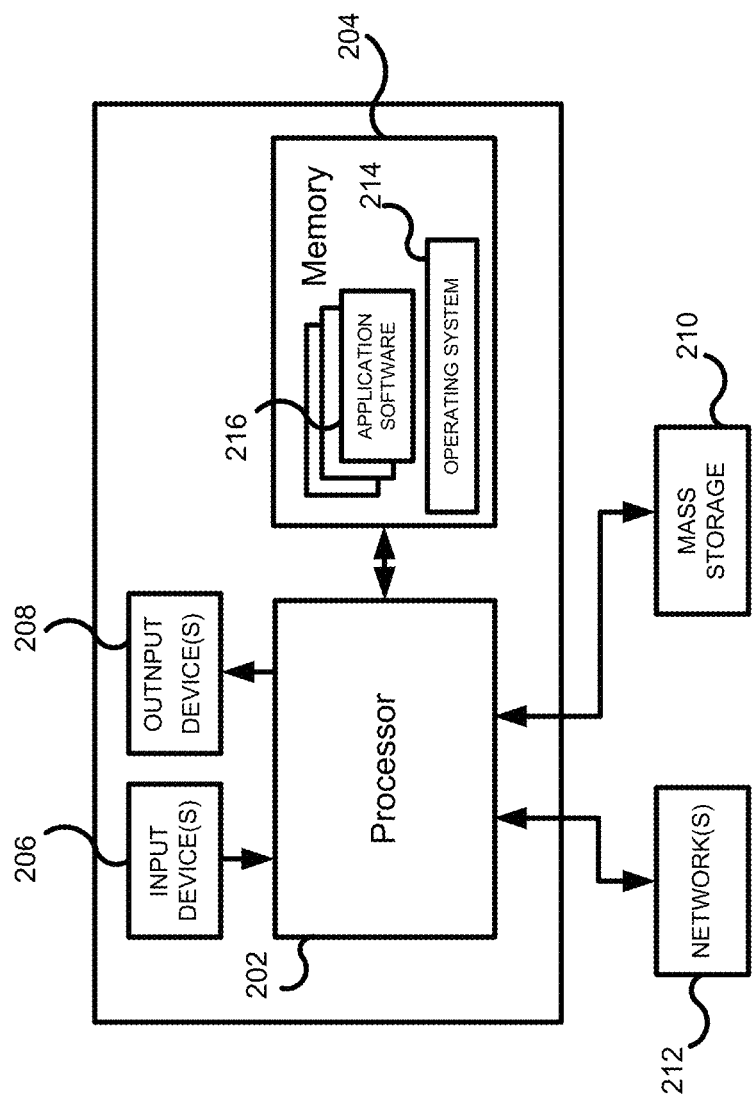
FIG. 2 illustrates an example of a computer system in accordance with one embodiment of the invention.

FIG. 2 illustrates an example of a computer system in accordance with one embodiment of the invention. Referring to FIG. 2, a hardware 200 typically includes at least one processor 202 coupled to a memory 204. The processor 202 may represent one or more processors (e.g. microprocessors), and the memory 204 may represent random access memory (RAM) devices comprising a main storage of the hardware 200, as well as any supplemental levels of memory, e.g., cache memories, non-volatile or back-up memories (e.g. programmable or flash memories), read-only memories, etc. In addition, the memory 204 may be considered to include memory storage physically located elsewhere in the hardware 200, e.g. any cache memory in the processor 202 as well as any storage capacity used as a virtual memory, e.g., as stored on a mass storage device 210.

The hardware 200 also typically receives a number of inputs and outputs for communicating information externally. For interfacing with a user or operator, the hardware 200 may include one or more user input devices 206 (e.g., a keyboard, a mouse, imaging device, scanner, etc.) and a one or more output devices 208 (e.g., a Liquid Crystal Display (LCD) panel, a sound playback device (speaker)). To embody the present invention, the hardware 200 must include at least one display or interactive element (for example, a touch screen), an interactive whiteboard or any other device which allows the user to interact with a computer by touching areas on the screen.

For additional storage, the hardware 200 may also include one or more mass storage devices 210, e.g., a floppy or other removable disk drive, a hard disk drive, a Direct Access Storage Device (DASD), an optical drive (e.g. a Compact Disk (CD) drive, a Digital Versatile Disk (DVD) drive, etc.) and/or a tape drive, among others. Furthermore, the hardware 200 may include an interface with one or more networks 212 (e.g., a local area network (LAN), a wide area network (WAN), a wireless network, and/or the Internet among others) to permit the communication of information with other computers coupled to the networks. It should be appreciated that the hardware 200 typically includes suitable analog and/or digital interfaces between the processor 202 and each of the components 204, 206, 208, and 212 as is well known in the art.

The hardware 200 operates under the control of an operating system 214, and executes various computer software applications, components, programs, objects, modules, etc. to implement the techniques described above. In particular, the computer software applications will include the client dictionary application, in the case of the client user device 102. Moreover, various applications, components, programs, objects, etc., collectively indicated by reference 216 in FIG. 2, may also execute on one or more processors in another computer coupled to the hardware 200 via a network 212, e.g. in a distributed computing environment, whereby the processing required to implement the functions of a computer program may be allocated to multiple computers over a network.

In general, the routines executed to implement the embodiments of the invention may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of computer-readable media used to actually effect the distribution. Examples of computer-readable media include but are not limited to recordable type media such as volatile and non-volatile memory devices, floppy and other removable disks, hard disk drives, optical disks (e.g., Compact Disk Read-Only Memory (CD-ROMs), Digital Versatile Disks (DVDs), flash memory, etc.), among others. Another type of distribution may be implemented as Internet downloads.

While certain exemplary embodiments have been described and shown in the accompanying drawings, it is to be understood that such embodiments are merely illustrative and not restrictive of the broad invention and that this invention is not limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure. It is intended that the appended claims be construed to include alternate implementations to the extent permitted.

I claim:

1. A method for providing language translation, the method comprising:
receiving at a computer device a plurality of words in an input language;
determining, via a processor at the computer device, a linguistic structure of the plurality of words in the input language;
determining, via the processor, semantics of the plurality of words in the input language;
determining, via the processor, the plurality of words in the input language using linguistic descriptions of the input language;
translating, via the processor, the plurality of words in the input language to an expression in an output language;

identifying, via the processor, at least one word of the plurality of words in the input language that has a syntactic ambiguity or a semantic ambiguity;

displaying on a user interface two or more options corresponding to two or more meanings associated with said syntactic ambiguity or said semantic ambiguity;

receiving, at the processor, an indication of selection of one or more of the two or more options corresponding to two or more meanings;

displaying an indication of the selection of the one or more of the two or more options corresponding to said two or more meanings;

searching a subject area of further options, the subject area corresponding to one or more respective subject areas corresponding to the said one or more of the two or more options; and displaying on the user interface one or more further options.

2. The method of claim 1, wherein displaying the indication of the selection of the one or more of the two or more options corresponding to said two or more meanings includes modifying the identified at least one word of the plurality of words in the output language.

3. The method of claim 1, wherein displaying the indication of the selection of the one or more of the two or more options corresponding to said two or more meanings includes changing, to one or more new words, the identified at least one word of the plurality of words in the output language.

4. The method of claim 1, wherein the options correspond to synonyms.

5. The method of claim 1, wherein receiving an indication of selection of more than one of the two or more options includes receiving an indication of a semantic class of meanings for the at least one word of the plurality of words in the input language.

6. The method of claim 1, wherein said one or more further options are in the output language.

7. The method of claim 1, wherein the two or more options corresponding to two or more meanings are presented in an order influenced by statistics related to the two or more meanings.

8. The method of claim 1, wherein the two or more options corresponding to two or more meanings are presented in an order influenced by a frequency of occurrence of the options in the input language.

9. The method of claim 1, wherein the two or more options corresponding to two or more meanings are presented in an order influenced by a frequency of occurrence of a translation of the respective options in the output language.

10. The method of claim 1, wherein the two or more options corresponding to two or more meanings are presented in an order influenced by statistics related to expressions in the output language.

11. The method of claim 1, wherein the two or more options corresponding to two or more meanings are presented in an order influenced by a statistical analysis of parallel corpora in the input language and in the output language.

12. The method of claim 1, wherein the method further comprises displaying on the user interface an option for selecting one of the two or more options corresponding to two or more meanings for accepting said one option for all instances of said ambiguity in the plurality of words in the input language.

13. A device for providing language translation, the device comprising:
a processor;
a memory in electronic communication with the processor, the memory configured with instructions for:
receiving a plurality of words in an input language;
determining a linguistic structure of the plurality of words in the input language;
determining a semantic relation among two or more of the plurality of words in the input language;
determining the plurality of words in the input language using linguistic descriptions of the input language;
translating the plurality of words in the input language to an expression in an output language;
identifying at least one word of the plurality of words in the input language that has a syntactic ambiguity or a semantic ambiguity;
displaying on a user interface two or more options corresponding to two or more meanings associated with said syntactic ambiguity or said semantic ambiguity;
receiving an indication of selection of one or more of the two or more options corresponding to two or more meanings;
displaying an indication of the selection of the one or more of the two or more options corresponding to said two or more meanings;
searching a subject area of further options, the subject area corresponding to one or more respective subject areas corresponding to the said one or more of the two or more options; and
displaying on the user interface one or more further options.

14. The device of claim 13, wherein displaying the indication of the selection of the one or more of the two or more options corresponding to said two or more meanings includes changing, to one or more new words, the identified at least one word of the plurality of words in the output language.

15. A non-transitory computer-accessible media encoded with instructions for performing a method, the method comprising:
receiving at a computer device a plurality of words in an input language;
determining, via a processor at the computer device, a linguistic structure of the plurality of words in the input language;
determining, via the processor, semantics of the plurality of words in the input language;
determining, via the processor, the plurality of words in the input language using linguistic descriptions of the input language;
translating, via the processor, the plurality of words in the input language to an expression in an output language;
identifying, via the processor, at least one word of the plurality of words in the input language that has a syntactic ambiguity or a semantic ambiguity;
displaying on a user interface two or more options corresponding to two or more meanings associated with said syntactic ambiguity or said semantic ambiguity;
receiving, at the processor, an indication of selection of one or more of the two or more options corresponding to two or more meanings;
displaying an indication of the selection of the one or more of the two or more options corresponding to said two or more meanings;
searching a subject area of further options, the subject area corresponding to one or more respective subject areas corresponding to the said one or more of the two or more options; and
displaying on the user interface one or more further options.

16. The non-transitory computer-accessible media of claim 15, wherein the two or more options corresponding to two or more meanings are presented in an order influenced by a frequency of occurrence of a translation of the respective options in the output language.

17. The non-transitory computer-accessible media of claim 15, wherein the two or more options corresponding to two or more meanings are presented in an order influenced by a statistical analysis of parallel corpora in the input language and in the output language.

* * * * *